F. I. Seymour.
Metal Top Lamp Chimney.
Nº 75302          Patented Mar. 10, 1868.
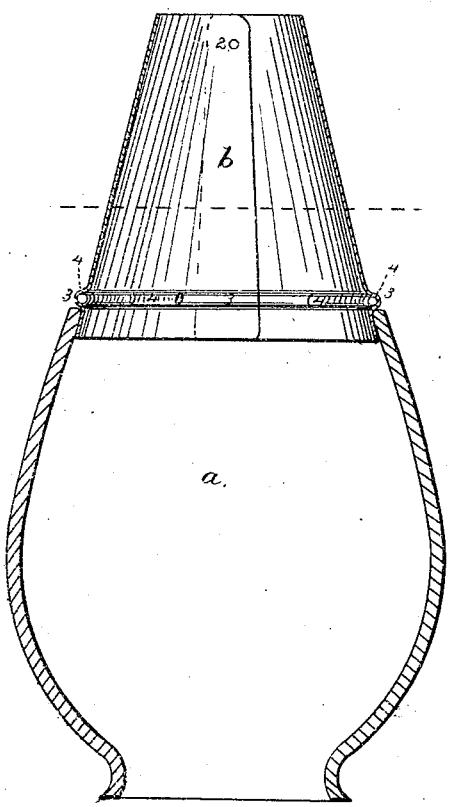
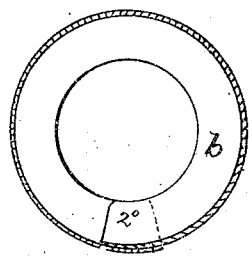
Witnesses:
Chas H Smith
Geo. D Walker
Inventor:
Fredk. I. Seymour

United States Patent Office.

FREDERICK I. SEYMOUR, OF WOLCOTTVILLE, CONNECTICUT.

Letters Patent No. 75,302, dated March 10, 1868.

IMPROVEMENT IN METAL-TOP LAMP-CHIMNEYS.

*The Schedule referred to in these Letters Patent and making part of the same.*

TO ALL WHOM IT MAY CONCERN:

Be it known that I, FREDERICK I. SEYMOUR, of Wolcottville, in the county of Litchfield, and State of Connecticut, have invented and made a certain new and useful Improvement in Lamp-Chimneys; and I do hereby declare the following to be a full, clear, and exact description of the said invention, reference being had to the annexed drawing, making part of this specification, wherein—

Figure 1 is a vertical section of my improved metal cap as applied to the glass chimney, and Figure 2 is an inverted sectional plan of the metal cap.

Similar marks of reference denote the same parts.

Lamp-chimneys have heretofore been made in which a metal cap or top is applied to a glass bulb or short chimney, as in Letters Patent granted to E. Brown, March 25, 1862. These are made of thin sheet metal spun up, and, in consequence of being of a definite size, require glass bulbs of accurate construction, in order that the metal and glass may fit properly together. This increases the cost of the glass, and the metallic extension is also costly, as nothing but brass, or a metal that can be spun up, will answer for such tops. In order to allow for variations in the size of the glass, a cone of sheet metal has been employed, the edges lapped, and small flanges attached to the exterior, as seen in Letters Patent granted to J. T. Townsend, March 1, 1864, but this is liable to become warped by the action of the heat, and is not reliable either in its attachment to the glass, or in being sufficiently tight to operate properly.

The nature of my said invention consists in a sheet-metal cone for a lamp-chimney, bent up to form, with the edges lapped, and connected together by a rivet near the smaller end of the conical cap, so as to hold the parts together at this point, and I form a shoulder for setting within the glass chimney by means of a bead, bent up in the sheet metal, and containing an expansive open ring of wire, which insures a firm connection of the sheet-metal cap to the glass chimney, even though the opening in said glass chimney may not be accurate in size, and the heat of the lamp will not injure the shape or firm attachment of the cap to the glass.

My sheet-metal cap is durable, can be made of sheet iron, or other cheap metal, and hence can be sold at a low price.

In the drawing, $a$ represents the glass chimney, of any usual size or shape. $b$ is my improved sheet-metal cap, formed as a truncated cone, the edges of which sheet metal are lapped and secured together by a rivet at 2, which allows the base to be contracted or expanded. Around the base of the cone, a bead, 3, is bent up in the sheet metal, to form a shoulder to set within the glass chimney, and within this bead 3 an open wire ring, 4, is introduced, and by its expansive force keeps the base of the sheet-metal cone tightly against the inside of the glass chimney.

The bead 3 may be any desired shape sectionally, and may be ornamented with milling, or in imitation of a rope, or otherwise.

What I claim, and desire to secure by Letters Patent, is—

1. Connecting the lapped edges of the sheet-metal cap, near the upper or smaller end, by means of a rivet, or its equivalent, for the purposes and substantially as set forth.

2. An expansive ring, introduced in the bead formed near the base of the sheet-metal cone, for the purposes and substantially as set forth.

In witness whereof, I have hereunto set my signature, this twenty-third day of January, A. D. 1867.

FREDK. I. SEYMOUR.

Witnesses:
CHAS. H. SMITH,
GEO. D. WALKER.